(12) United States Patent
Tomo et al.

(10) Patent No.: US 9,352,463 B2
(45) Date of Patent: May 31, 2016

(54) ROBOT SYSTEM AND METHOD FOR TRANSFERRING WORKPIECE

(71) Applicant: KABUSHIKI KAISHA YASKAWA DENKI, Kitakyushu-shi (JP)

(72) Inventors: Toshihiro Tomo, Kitakyushu (JP); Toshiaki Shimono, Kitakyushu (JP)

(73) Assignee: KABUSHIKI KAISHA YASKAWA DENKI, Kitkyushu-Shi (JP)

( * ) Notice: Subject to any disclaimer, the term of this patent is extended or adjusted under 35 U.S.C. 154(b) by 0 days.

(21) Appl. No.: 14/210,444

(22) Filed: Mar. 14, 2014

(65) Prior Publication Data

US 2014/0277711 A1    Sep. 18, 2014

(30) Foreign Application Priority Data

Mar. 14, 2013    (JP) .................................. 2013-052163

(51) Int. Cl.
*G06F 19/00* (2011.01)
*B25J 9/16* (2006.01)
*B25J 15/06* (2006.01)

(52) U.S. Cl.
CPC ............ *B25J 9/1612* (2013.01); *B25J 15/0616* (2013.01); *B25J 9/16* (2013.01); *B25J 9/1615* (2013.01); *G05B 2219/40006* (2013.01)

(58) Field of Classification Search
CPC ............... B25J 15/0616; B25J 9/1612; G05B 2219/40006; B65G 57/08; B65G 57/081; B65G 17/323
USPC ................................................. 700/245–264
See application file for complete search history.

(56) References Cited

U.S. PATENT DOCUMENTS

| | | | | |
|---|---|---|---|---|
| 5,177,563 | A * | 1/1993 | Everett ................... | B25J 9/1692 356/621 |
| 5,606,153 | A * | 2/1997 | Fix et al. ........................ | 177/145 |
| 8,892,244 | B1 * | 11/2014 | Taylor ................... | F41H 5/0492 156/64 |
| 8,941,726 | B2 | 1/2015 | Marks et al. | |
| 2004/0037689 | A1 * | 2/2004 | Watanabe .............. | B25J 9/1697 414/730 |
| 2004/0172164 | A1 * | 9/2004 | Habibi et al. ................. | 700/245 |
| 2004/0186624 | A1 * | 9/2004 | Oda ........................ | B25J 9/1697 700/245 |

(Continued)

FOREIGN PATENT DOCUMENTS

| | | |
|---|---|---|
| DE | 102007062534 A1 | 6/2009 |
| EP | 1442848 A2 | 8/2004 |

(Continued)

OTHER PUBLICATIONS

Translation for reference JP2000141268A.*

(Continued)

*Primary Examiner* — Jason Holloway
*Assistant Examiner* — Rachid Bendidi
(74) *Attorney, Agent, or Firm* — Mori & Ward, LLP

(57) ABSTRACT

A robot system includes a first robot arm and a controller. The first robot arm extends in a first direction and includes a holder to hold a workpiece placed on a workpiece placement stand. The holder includes a distal end portion and a base portion. The base portion is coupled to the first robot arm such that a turning axis of a portion of the first robot arm to which the base portion of the holder is coupled is apart from a geometrical center of the holder. The controller controls the holder to hold the workpiece while controlling the first robot arm to turn the holder with the distal end portion of the holder oriented in a direction crossing the first direction.

15 Claims, 11 Drawing Sheets

(56) References Cited

U.S. PATENT DOCUMENTS

| | | | |
|---|---|---|---|
| 2006/0182607 A1* | 8/2006 | Clark | B25J 15/0616 414/744.5 |
| 2006/0259195 A1* | 11/2006 | Eliuk | A61J 1/20 700/245 |
| 2007/0177790 A1* | 8/2007 | Ban | B25J 9/1697 382/153 |
| 2009/0099520 A1* | 4/2009 | Millman | A61B 19/2203 604/131 |
| 2010/0272547 A1* | 10/2010 | Cottone | B25J 9/1697 414/426 |
| 2011/0141251 A1 | 6/2011 | Marks et al. | |
| 2011/0185556 A1* | 8/2011 | Hirano et al. | 29/428 |
| 2011/0222995 A1* | 9/2011 | Irie | B25J 9/1687 414/225.01 |
| 2012/0063873 A1* | 3/2012 | Kaneko | B25J 15/0052 414/732 |
| 2013/0085604 A1* | 4/2013 | Irie et al. | 700/258 |
| 2013/0085605 A1* | 4/2013 | Yasuda et al. | 700/259 |
| 2013/0158710 A1* | 6/2013 | Oda | 700/259 |
| 2014/0079525 A1* | 3/2014 | Krimpmann | B25J 15/0616 414/797 |

FOREIGN PATENT DOCUMENTS

| | | |
|---|---|---|
| JP | 11-163093 | 6/1999 |
| JP | 11163093 | 6/1999 |
| JP | 2000-141268 | 5/2000 |
| JP | 2000141268 A * | 5/2000 |
| JP | 2001-317911 | 11/2001 |
| JP | 2007283436 A * | 11/2007 |
| JP | 2010-93022 | 4/2010 |
| JP | 2010093022 A | 4/2010 |
| JP | 2011-123887 | 6/2011 |
| WO | WO 2010041492 A * | 4/2010 |

OTHER PUBLICATIONS

Translation for reference JP2007283436A.*
Translation for reference WO2010041492A.*
Extended European Search Report for corresponding EP Application No. 14157160.4-1807, Jan. 30, 2015.
Japanese Office Action for corresponding JP Application No. 2013-052163, Sep. 16, 2014.
Chinese Office Action for corresponding CN Application No. 201310739274.8, Aug. 3, 2015.

* cited by examiner

FIG. 19   Comparative example
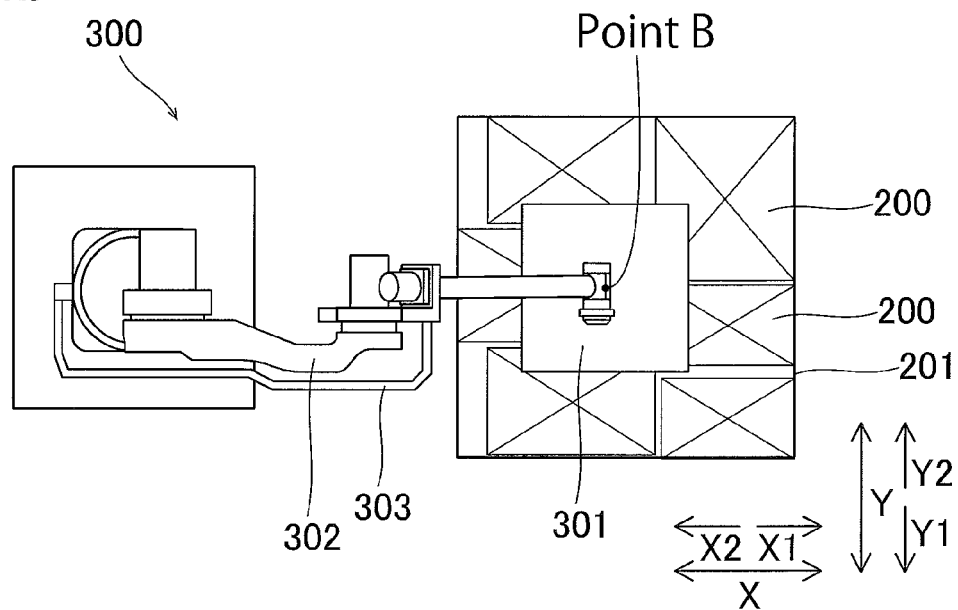
FIG. 20   Comparative example
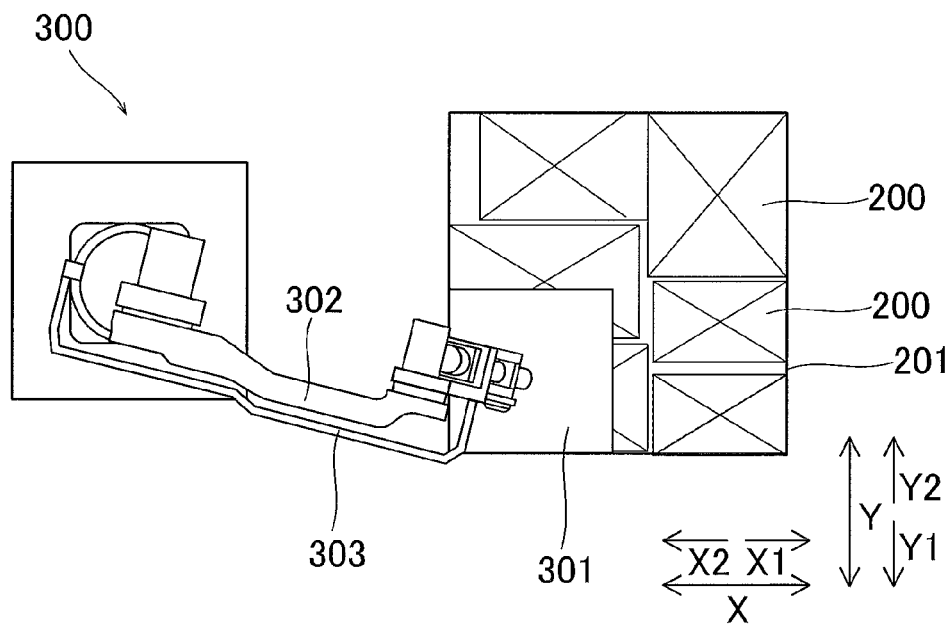

ROBOT SYSTEM AND METHOD FOR TRANSFERRING WORKPIECE

CROSS-REFERENCE TO RELATED APPLICATIONS

The present application claims priority under 35 U.S.C. §119 to Japanese Patent Application No. 2013-052163, filed Mar. 14, 2013. The contents of this application are incorporated herein by reference in their entirety.

BACKGROUND OF THE INVENTION

1. Field of the Invention

The present invention relates to a robot system and a method for transferring a workpiece.

2. Discussion of the Background

Japanese Unexamined Patent Application Publication No. 2001-317911 discloses a depalletizing apparatus that includes a robot arm. The robot arm includes a hand to hold a workpiece placed on a pallet. The depalletizing apparatus captures an image of the workpiece from above the pallet and detects the position of the workpiece based on the captured image. The robot arm is moved based on the detected position of the workpiece, and the hand holds the workpiece.

SUMMARY

According to one aspect of the present disclosure, a robot system includes a first robot arm and a robot controller. The first robot arm is configured to extend in a first direction and includes a holder configured to hold a workpiece placed on a workpiece placement stand. The holder includes a distal end portion and a base portion. The base portion is coupled to the first robot arm such that a turning axis of a portion of the first robot arm to which the base portion of the holder is coupled is apart from a geometrical center of the holder. The robot controller is configured to control the holder to hold the workpiece placed on the workpiece placement stand while controlling the first robot arm to turn the holder with the distal end portion of the holder oriented in a direction crossing the first direction.

According to another aspect of the present disclosure, a method for transferring a workpiece includes controlling a robot arm to turn a holder including a distal end portion and a base portion that is coupled to the robot arm so as to orient the distal end portion of the holder in a direction crossing a first direction in which the robot arm is configured to extend, and so as to make a turning axis of a portion of the robot arm to which the base portion of the holder is coupled apart from a geometrical center of the holder. The holder is controlled to turn to hold a workpiece placed on a workpiece placement stand.

According to the other aspect of the present disclosure, a robot system includes a holder, a first robot arm, an approximately rectangular workpiece placement stand, and a controller. The holder is configured to hold a workpiece. The first robot arm holds the holder turnably about a turning axis. On the workpiece placement stand, the workpiece is placed. The controller is configured to control an operation of the holder and an operation of the first robot arm. The holder includes two surfaces that approximately overlap the workpiece placement stand when the holder holds the workpiece.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 19 is a perspective view of a robot according to a comparative example;

FIG. 20 is a diagram illustrating an operation of holding the workpiece by the robot according to the comparative example;

DESCRIPTION OF THE EMBODIMENTS

Figure 1:
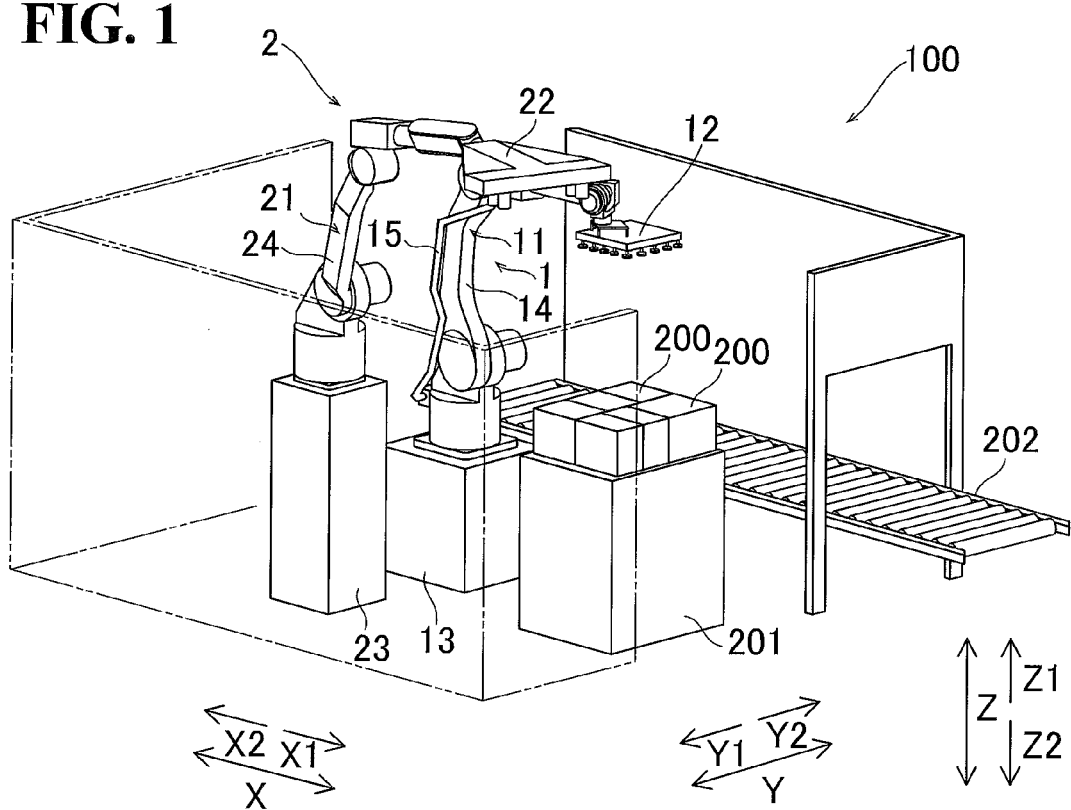
FIG. 1 is a schematic representation of a robot system according to an embodiment.

The embodiments will be described with reference to the accompanying drawings, wherein like reference numerals designate corresponding or identical elements throughout the various drawings.

First, a configuration of a robot system 100 according to an embodiment will be described by referring to FIGS. 1 to 15.

As shown in FIG. 1, the robot system 100 includes a depalletizing robot 1 and a detection robot 2. The detection robot 2 detects a workpiece 200. Examples of the depalletizing robot 1 and the detection robot 2 include, but are not limited to, a perpendicularly articulated robot. A pallet 201 is disposed adjacent to (on an X1 direction side of) the depalletizing robot 1 and the detection robot 2. On the pallet 201, a plurality of workpieces 200 of different sizes and shapes are stacked. Examples of the workpiece 200 include, but are not limited to, a box-shaped workpiece. The pallet 201 has an approximately rectangular shape (that is, a box-shape having walls). In plan view, the approximately rectangular shape of the pallet 201 surrounds the workpieces 200. A conveyor 202 is disposed adjacent to (on a Y2 direction side of) the depalletizing robot 1. The conveyor 202 receives (and transfers) the workpiece 200. The pallet 201 is an example of the "workpiece placement stand".

Figure 2:
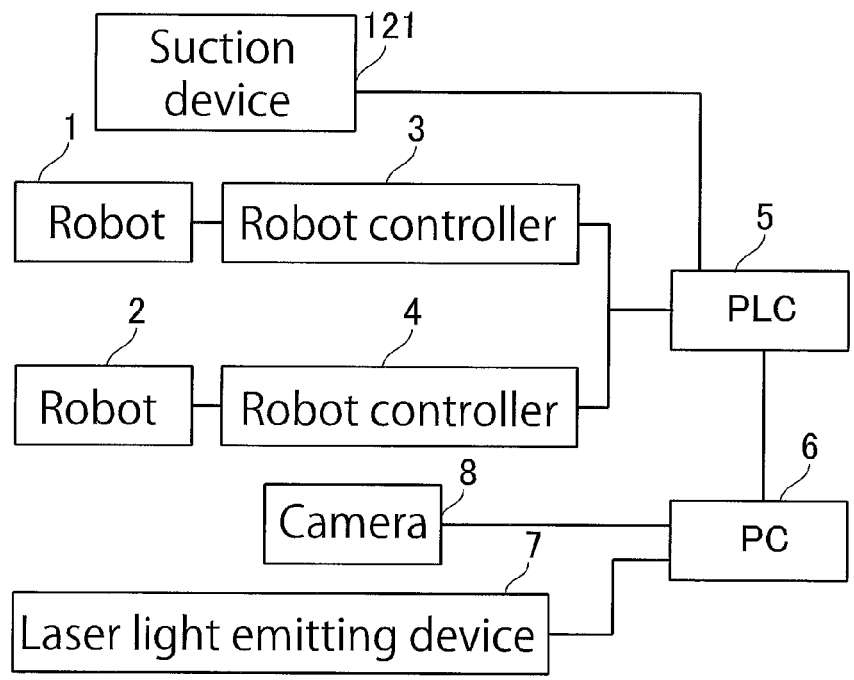
FIG. 2 is a block diagram of the robot system according to the embodiment.

As shown in FIG. 2, the depalletizing robot 1 is coupled to a robot controller 3. The detection robot 2 is coupled to a robot controller 4. The robot controller 3 and the robot controller 4 are coupled to a PLC (programmable logic controller) 5. The PLC 5 is coupled to a PC (Personal Computer) 6. The PC 6 controls an overall operation of the robot system 100. The PC 6 is also coupled to a laser light emitting device 7 and a camera 8. The laser light emitting device 7 and the camera 8 detect the arrangement state of the workpiece 200. The PC 6 is an example of the "controller".

Figure 3:
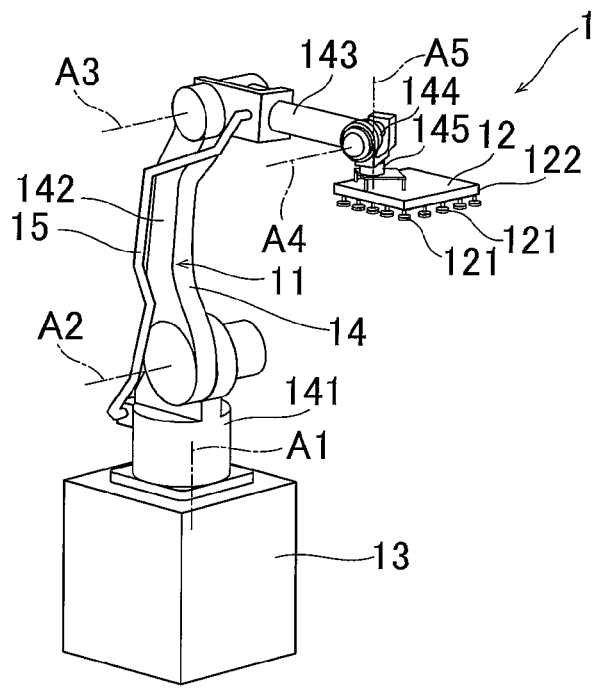
FIG. 3 is a perspective view of a depalletizing robot of the robot system according to the embodiment.

As shown in FIG. 3, the depalletizing robot 1 includes a robot main body 11 and a robot hand 12. The robot hand 12 is mounted on the distal end of the robot main body 11 in order to suck and hold the workpiece 200 placed on the pallet 201. The robot main body 11 includes a base 13 and a robot arm 14. The depalletizing robot 1 includes a cable 15 and other elements coupled to the robot arm 14. The robot hand 12 is an example of the "holder". The robot arm 14 is an example of the "first robot arm".

The base 13 is secured to an installation surface such as a floor, a wall, and a ceiling. The robot arm 14 has five degrees of freedom. The robot arm 14 includes a plurality of arm structures. An arm structure 141 is coupled to the base 13 in a rotatable manner about a rotation axis A1, which is perpendicular to the installation surface. An arm structure 142 is coupled to the arm structure 141 in a rotatable manner about a rotation axis A2, which is perpendicular to the rotation axis A1. An arm structure 143 is coupled to the arm structure 142 in a rotatable manner about a rotation axis A3, which is parallel to the rotation axis A2. An arm structure 144 is coupled to the arm structure 143 in a rotatable manner about a rotation axis A4, which is parallel to the rotation axis A3. An arm structure 145 is coupled to the arm structure 144 in a rotatable manner about a rotation axis A5, which is perpendicular to the rotation axis A4. It is noted that "parallel", "rectangular", "square", "perpendicular", as used herein, are not only intended to mean precisely "parallel", "rectangular", "square", "orthogonal" and "perpendicular", respectively, but also intended more broadly to encompass slight differences from being "parallel" and "perpendicular". Each of the rotation axes A1 to A5 is equipped with a servo motor. Each servo motor includes an encoder to detect the rotation position of the servo motor. Each servo motor is coupled to the robot controller 3. Thus, each servo motor operates based on a command from the robot controller 3.

Figure 4:
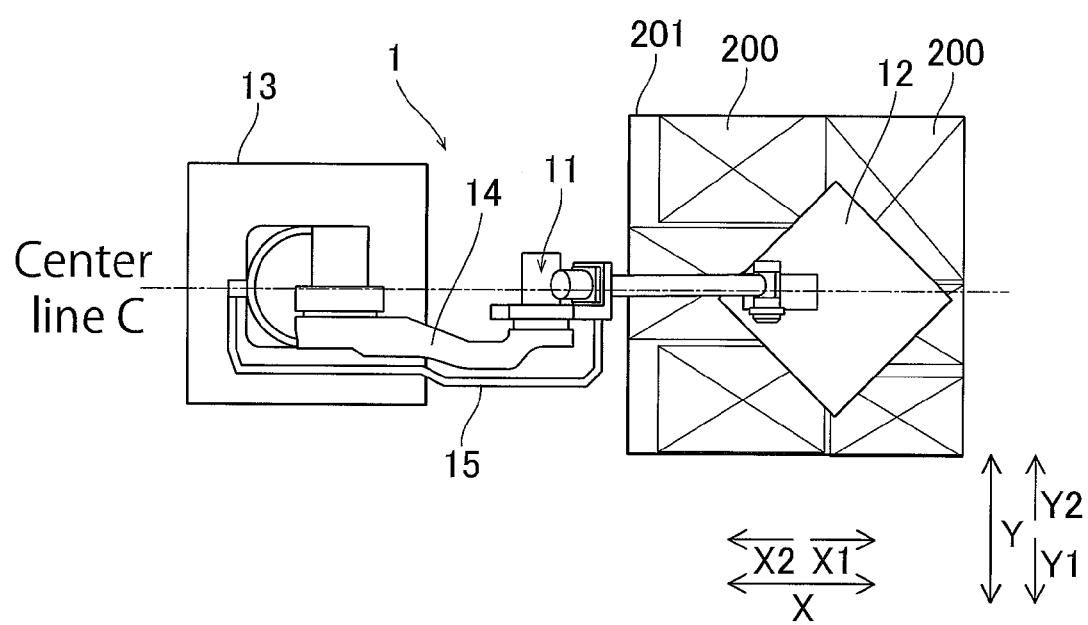
FIG. 4 is a plan view of the depalletizing robot of the robot system according to the embodiment.

As shown in FIG. 4, in plan view, the depalletizing robot 1 is asymmetric with respect to a center line C, which is aligned in an X direction, in which the robot arm 14 of the depalletizing robot 1 extends, such that the robot arm 14 protrudes to one side (a Y1 direction side) of a Y direction. Similarly, the cable 15 also protrudes to the Y1 direction side. As used herein, the phase "in plan view" means "when seen from a direction opposite the workpiece at the time of holding of the workpiece (in many cases, from upward in the direction of gravitational force)".

Figure 5:
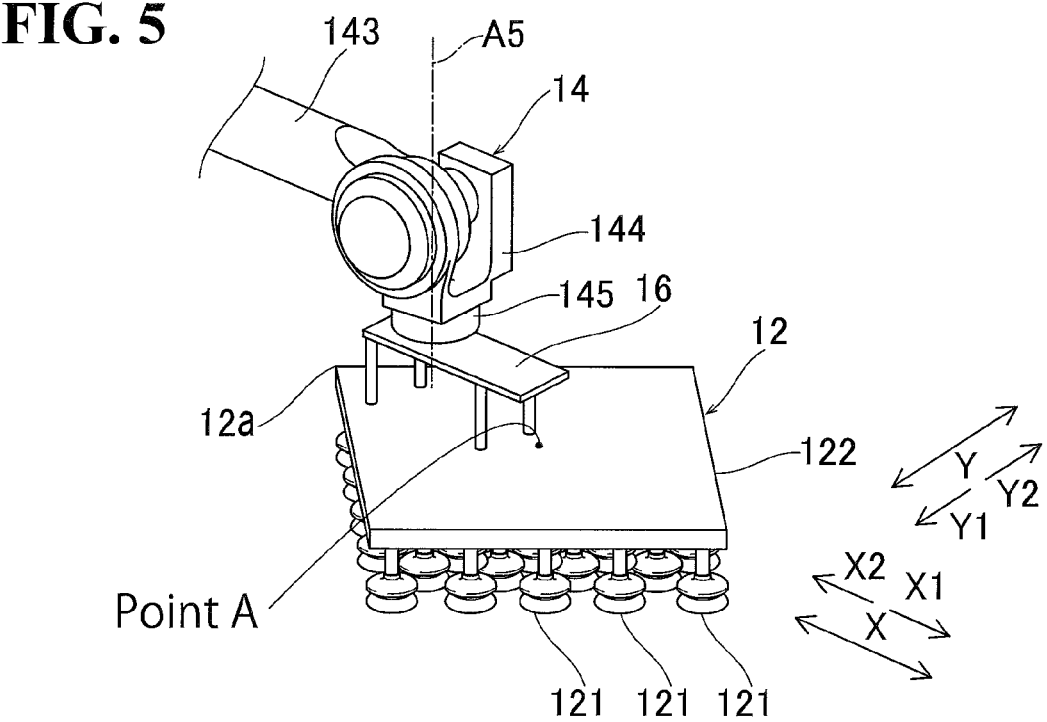
FIG. 5 is a perspective view of a robot hand of the depalletizing robot of the robot system according to the embodiment.
Figure 6:
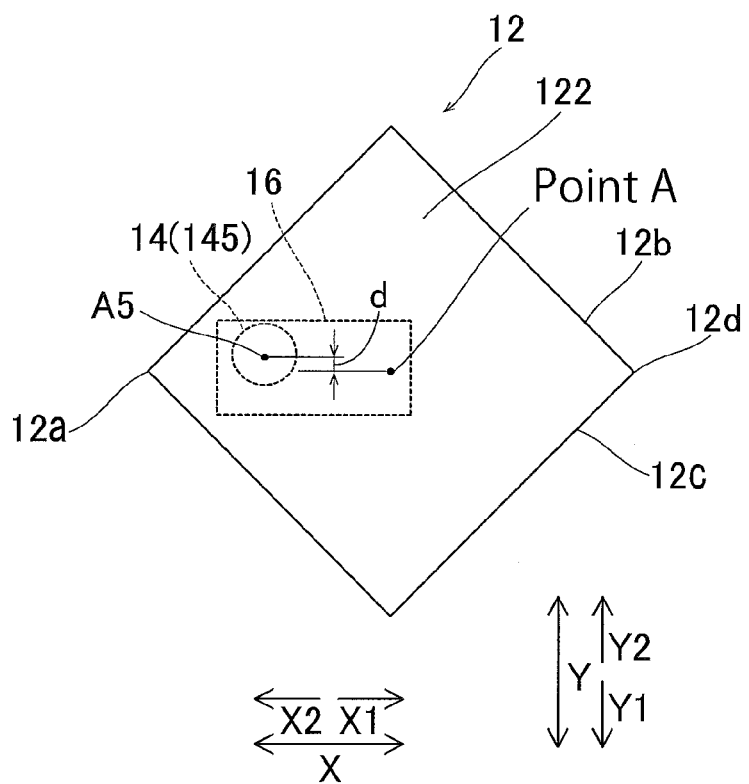
FIG. 6 is a plan view of the robot hand of the depalletizing robot of the robot system according to the embodiment.

In this embodiment, as shown in FIGS. 5 and 6, a base portion (which is on an X2 direction side) of the robot hand 12 is coupled to the robot arm 14 (more specifically, to the arm structure 145) such that in plan view, a turning axis A5 of the portion (that is, the arm structure 145) of the robot arm 14 to which the base portion of the robot hand 12 is coupled is apart from the geometrical center (the point A, which is the geometrical center of gravity) of the robot hand 12. Specifically, the robot hand 12 has an approximately square shape in plan view, and is coupled to the robot arm 14 at a position adjacent to a corner 12a of the base portion of the approximately square shape of the robot hand 12.

Also in this embodiment, as shown in FIG. 6, in plan view, the base portion of the robot hand 12 coupled to the robot arm 14 is at a position offset from the geometrical center of the robot hand 12 (that is, from the point A) by a predetermined distance d in the Y direction (more specifically, to a Y2 direction), which is orthogonal to the X direction, in which the robot arm 14 extends. In other words, in plan view, the robot hand 12 is coupled to the robot arm 14 at a position in the base portion of the robot hand 12 offset by the predetermined distance d in the Y2 direction side, which is opposite to the direction (the Y1 direction) in which the robot arm 14 (as well as the cable 15) protrudes. The robot arm 14 and the robot hand 12 are coupled to each other via a coupling device (bracket) 16.

Figure 7:
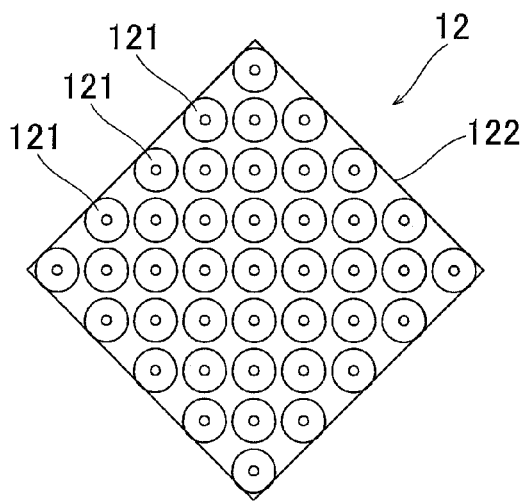
FIG. 7 is a bottom view of the robot hand of the depalletizing robot of the robot system according to the embodiment.
Figure 8:
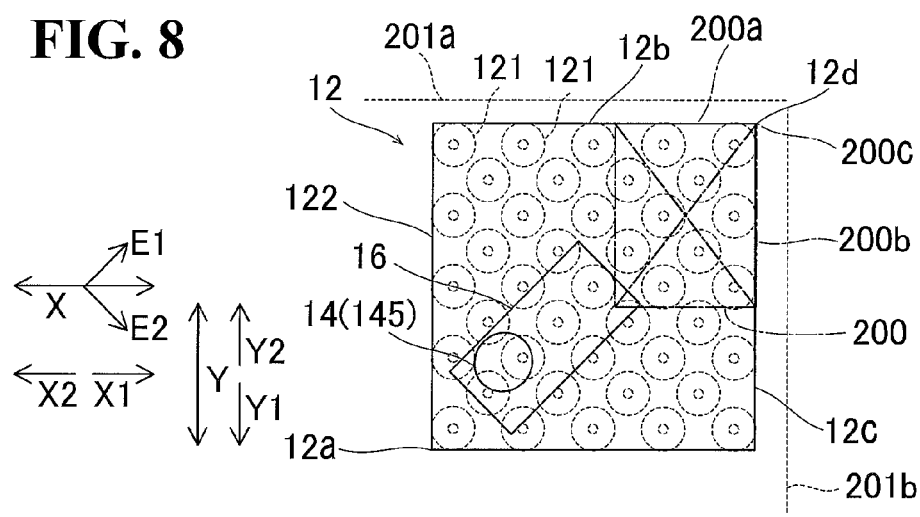
FIG. 8 illustrates a state in which the robot hand of the robot system according to the embodiment is holding a workpiece arranged to be approximately parallel to the sides of a pallet.
Figure 9:
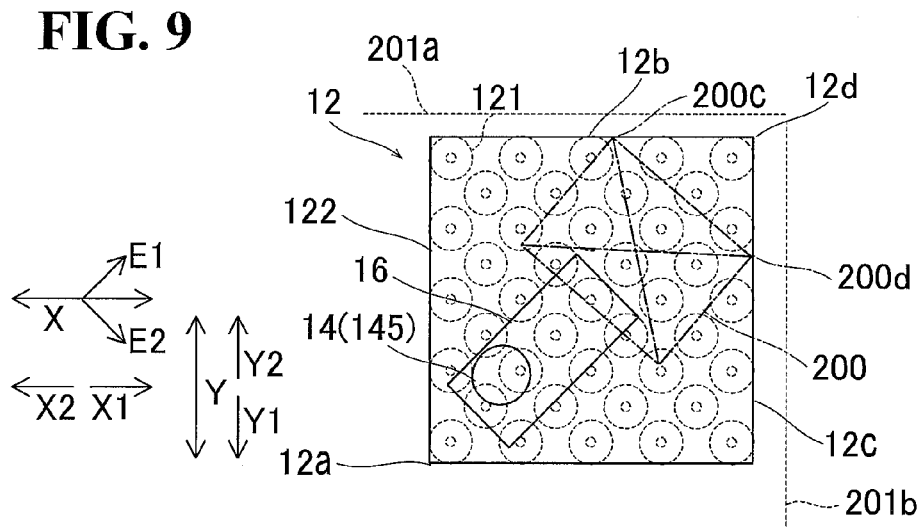
FIG. 9 illustrates a state in which the robot hand of the robot system according to the embodiment is holding a workpiece arranged to cross the sides of the pallet.

As shown in FIGS. 5 and 7, the robot hand 12 includes a plurality of suction devices 121 and a robot hand main body 122. The plurality of suction devices 121 hold the workpiece 200 placed on the pallet 201 by gaseous suction force (or pneumatic suction force). The plurality of suction devices 121 are mounted on the robot hand main body 122. Based on an image of the workpiece 200 captured by the camera 8, which is disposed on the detection robot 2, the PC 6 controls the robot hand 12 to hold the workpiece 200 such that some of the suction devices 121 positioned at a portion where the workpiece 200 and the robot hand 12 overlap are switched to operation mode, while the other suction devices 121 are left in nonoperation mode. For example, as shown in FIGS. 8 and 9, when the workpiece 200 is smaller than the robot hand 12 in plan view, some of the suction devices 121 positioned at the portion where the workpiece 200 and the robot hand 12 overlap are switched to operation mode. When the workpiece 200 is equal to or larger in size than the robot hand 12 in plan view, all the suction devices 121 are switched to operation mode.

In this embodiment, as shown in FIGS. 10 to 13, the PC 6 controls the suction devices 121 to hold the workpiece 200 placed on the pallet 201 while controlling the robot arm 14 to turn the suction devices 121 such that the distal end portions of the suction devices 121 are oriented in a direction (an E1 direction or an E2 direction) crossing the X direction, in which the robot arm 14 extends. The PC 6 also controls the robot hand 12 to hold the workpiece 200 while controlling the robot arm 14 to turn the suction devices 121 such that in plan view, the distal end portion of the robot hand 12 is oriented in the direction crossing the X direction (the E1 direction and the E2 direction) from a basic state in which the distal end portion and the base portion of the robot hand 12 are aligned in the X direction (see FIG. 4).

Figure 10:
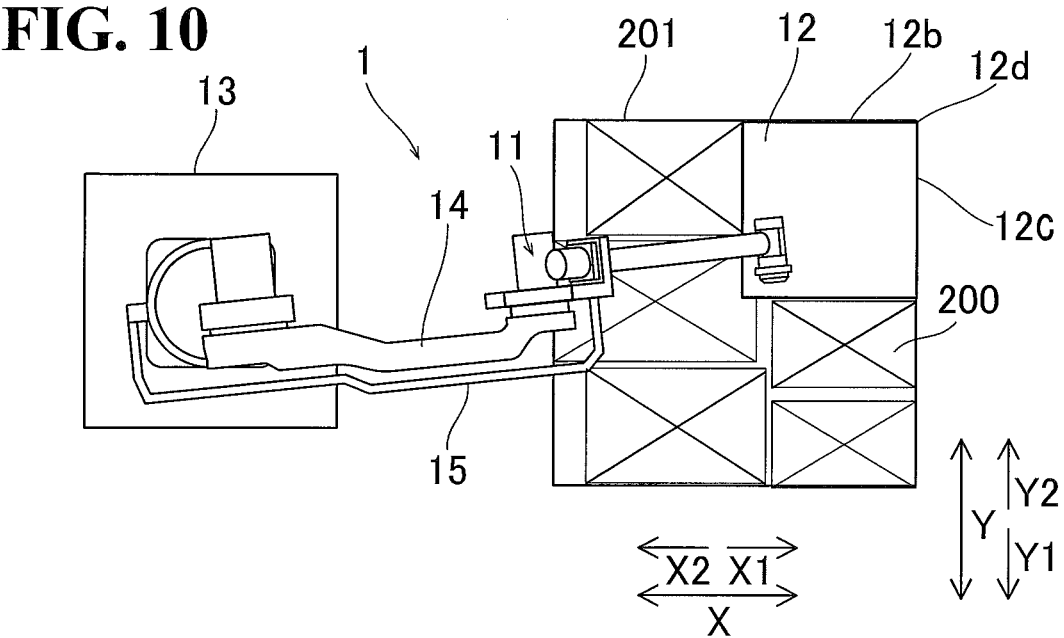
FIG. 10 illustrates a state in which the robot hand of the robot system according to the embodiment is disposed on the upper right corner of the pallet.
Figure 11:
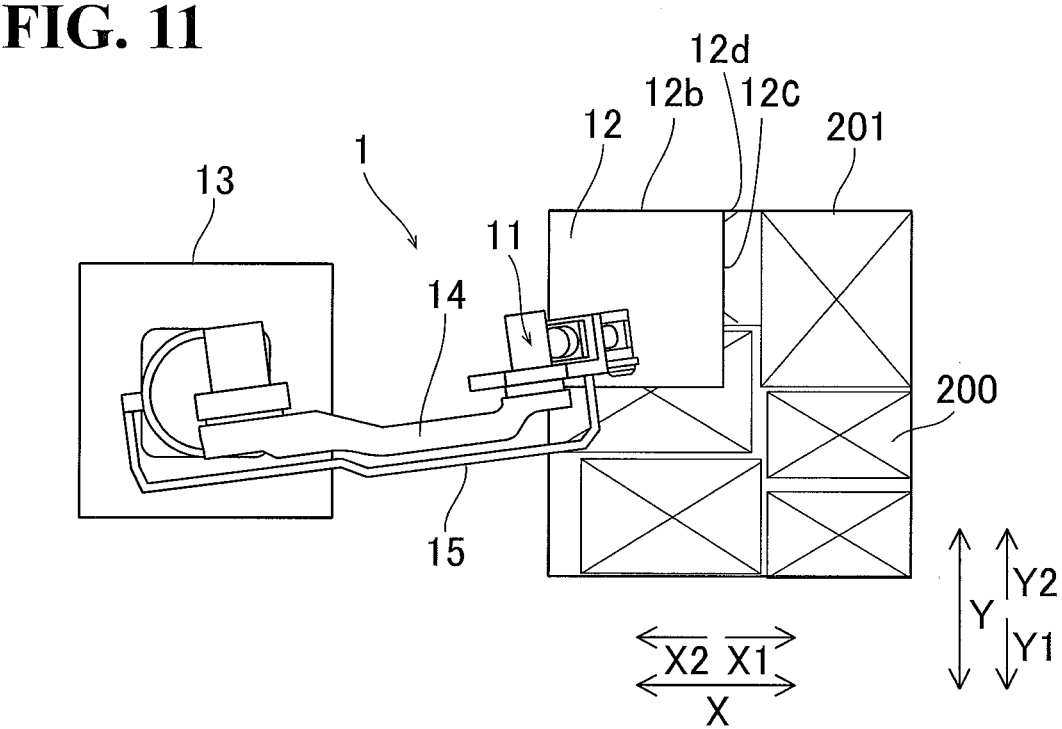
FIG. 11 illustrates a state in which the robot hand of the robot system according to the embodiment is disposed on the upper left corner of the pallet.
Figure 12:
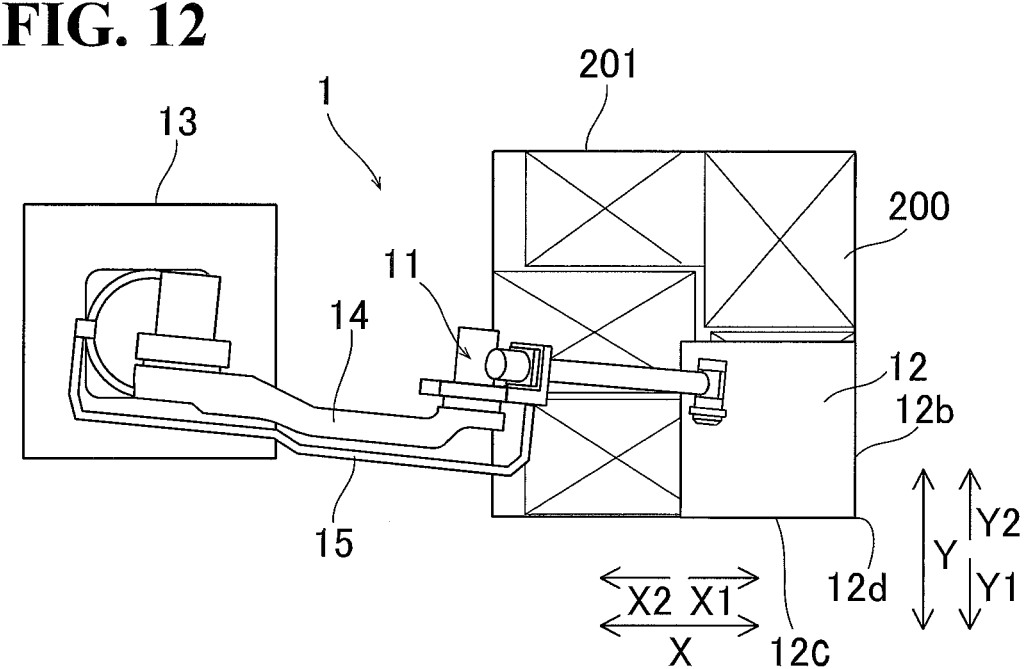
FIG. 12 illustrates a state in which the robot hand of the robot system according to the embodiment is disposed on the lower right corner of the pallet.
Figure 13:
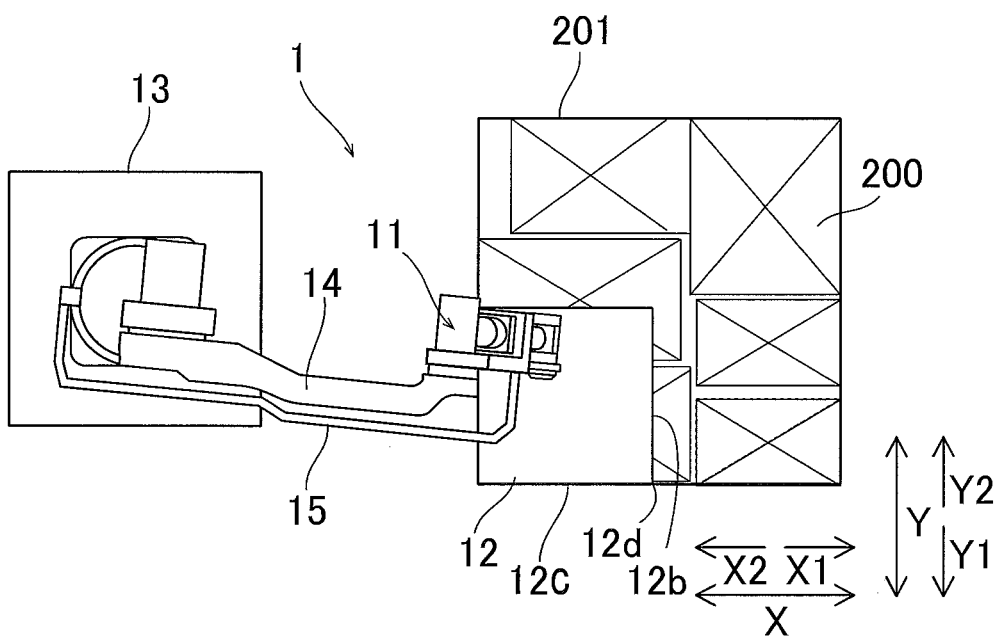
FIG. 13 illustrates a state in which the robot hand of the robot system according to the embodiment is disposed on the lower left corner of the pallet.

Specifically, as shown in FIGS. 10 and 11, when the workpiece 200 to be held by the robot hand 12 is disposed on the Y2 direction side, which crosses the X direction, then the PC 6 controls the robot hand 12 to hold the workpiece 200 while controlling the robot arm 14 to turn the robot hand 12 to the Y2 direction side from the basic state (see FIG. 4). As shown in FIGS. 12 and 13, when the workpiece 200 to be held by the robot hand 12 is disposed on the Y1 direction side, then the PC 6 controls the robot hand 12 to hold the workpiece 200 while controlling the robot arm 14 to turn the robot hand 12 to the Y1 direction side from the basic state.

Also in this embodiment, as shown in FIGS. 8 and 9, the PC 6 controls the suction devices 121 to hold the workpiece 200 while controlling the robot arm 14 to turn the robot hand 12 by approximately 45 degrees such that two sides 12b and 12c (that is, outer edges) of the approximately square shape of the robot hand 12, which are orthogonal to each other at the distal end portion of the robot hand 12, are respectively parallel to two sides 201a and 201b of the pallet 201.

As shown in FIG. 8, when the workpiece 200 is disposed with its sides 200a and 200b being respectively approximately parallel to the two sides 201a and 201b of the pallet 201, the robot hand 12 holds the workpiece 200 while being held moved (or turned) by the robot arm 14 in the following manner. In plan view, the two sides 12b and 12c (that is, the outer edges) of the robot hand 12, which are orthogonal to each other at the distal end portion of the robot hand 12, respectively overlap the sides 200a and 200b of the workpiece 200, and a corner 12d of the distal end portion of the robot hand 12 overlaps a corner 200c of the workpiece 200. Even when the workpiece 200 is disposed adjacent to a corner of the pallet 201 or adjacent to the center of the pallet 201, the robot hand 12 holds the workpiece 200 such that the two sides 12b and 12c (that is, the outer edges) of the robot hand 12 respectively overlap two of the four sides of the workpiece 200, and such that the corner 12d of the distal end portion of the robot hand 12 overlaps one of the four corners of the workpiece 200.

As shown in FIG. 9, when the workpiece 200 is disposed with its four sides crossing the two sides 201a and 201b of the pallet 201, the robot hand 12 holds the workpiece 200 while being moved (or turned) by the robot arm 14 in the following manner. In plan view, the two sides 12b and 12c (that is, outer edges) of the robot hand 12, which are orthogonal to each other at the distal end portion of the robot hand 12, respectively overlap the two corners 200c and 200d of the workpiece 200.

Figure 14:
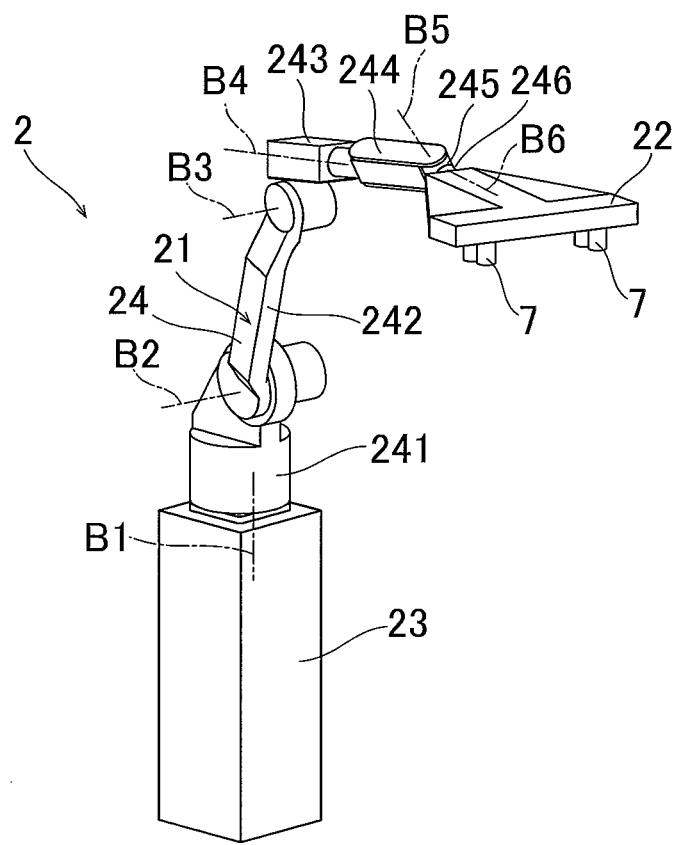
FIG. 14 is a perspective view of a detection robot of the robot system according to the embodiment.

As shown in FIG. 14, the robot 2 includes a robot main body 21 and a robot hand 22. The robot hand 22 is mounted on the distal end of the robot main body 21. The robot main body 21 includes a base 23 and a robot arm 24.

The base 23 is secured to an installation surface such as a floor, a wall, and a ceiling. The robot arm 24 has six degrees of freedom. The robot arm 24 includes a plurality of arm structures. An arm structure 241 is coupled to the base 23 in a rotatable manner about a rotation axis B1, which is perpendicular to the installation surface. An arm structure 242 is coupled to the arm structure 241 in a rotatable manner about a rotation axis B2, which is perpendicular to the rotation axis B1. An arm structure 243 is coupled to the arm structure 242 in a rotatable manner about a rotation axis B3, which is parallel to the rotation axis B2. An arm structure 244 is coupled to the arm structure 243 in a rotatable manner about a rotation axis B4, which is perpendicular to the rotation axis B3. An arm structure 245 is coupled to the arm structure 244 in a rotatable manner about a rotation axis B5, which is perpendicular to the rotation axis B4. An arm structure 246 is coupled to the arm structure 245 in a rotatable manner about a rotation axis B6, which is perpendicular to the rotation axis B5. It is noted that "parallel" and "perpendicular", as used herein, are not only intended to mean precisely "parallel" and "perpendicular", respectively, but also intended more broadly to encompass slight differences from being "parallel" and "perpendicular". Each of the rotation axes B1 to B6 is equipped with a servo motor (joint). Each servo motor includes an encoder to detect the rotation position of the servo motor. Each servo motor is coupled to the robot controller 4. Thus, each servo motor operates based on a command from the robot controller 4. The robot arm 24 is an example of the "second robot arm".

Figure 15:
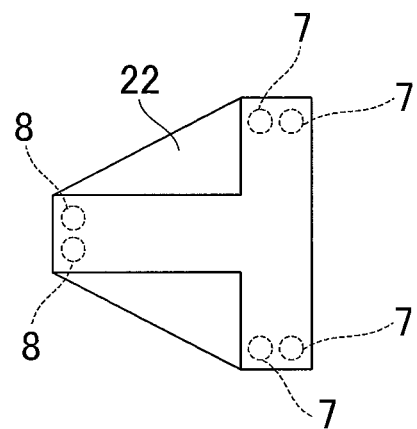
FIG. 15 is a plan view of a robot hand of the detection robot of the robot system according to the embodiment.

As shown in FIG. 15, the robot hand 22 includes the laser light emitting device 7 and the camera 8 (that is, a stereoscopic camera). The laser light emitting device 7 emits laser light to the workpiece 200. The camera 8 detects the laser light reflected from the workpiece 200. The laser light emitting device 7 and the camera 8 are an example of the "detector". The laser light emitting device 7 emits, for example, cross-shaped laser light (that is, laser light crossing each other) to the workpiece 200. At the same time, the camera 8 detects (that is, captures an image of) the laser light reflected from the workpiece 200. Then, based on the detection result (that is, the captured image), the PC 6 calculates (or measures) an arrangement state of the workpiece 200 (such as the height of the workpiece 200 (more specifically, the height position of the upper surface of the workpiece 200), and the rotational angle, position, shape, and size of the workpiece 200). Then, in this embodiment, the PC 6 controls the robot arm 14 to move based on the arrangement state of the workpiece 200 detected by the laser light emitting device 7 and the camera 8, and controls the robot hand 12 to hold the workpiece 200 placed on the pallet 201.

Next, an operation of the robot system 100 according to the embodiment will be described by referring to FIGS. 16 to 18.

Figure 16:
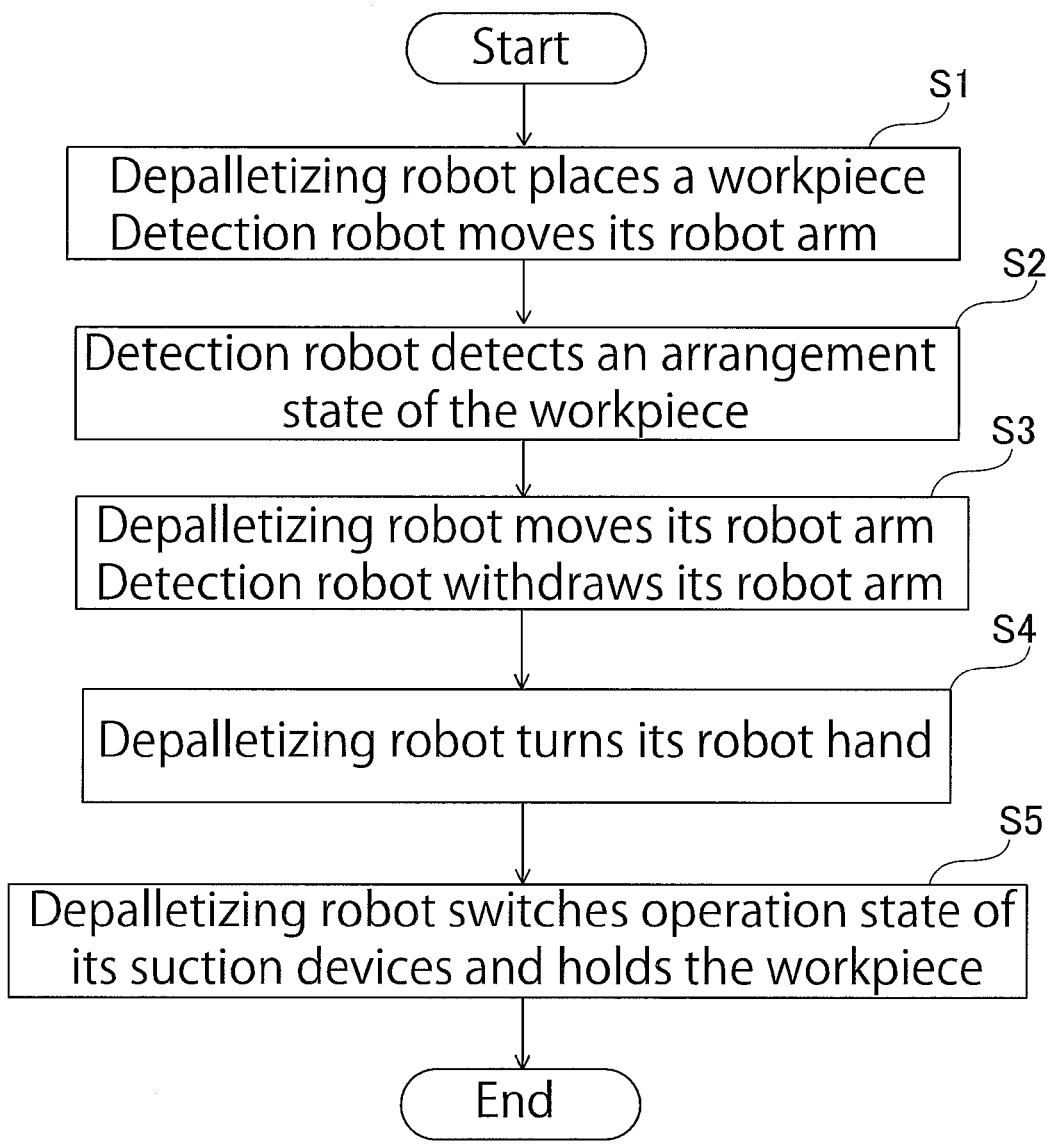
FIG. 16 is a flowchart of operations of the robot system according to the embodiment.
Figure 17:
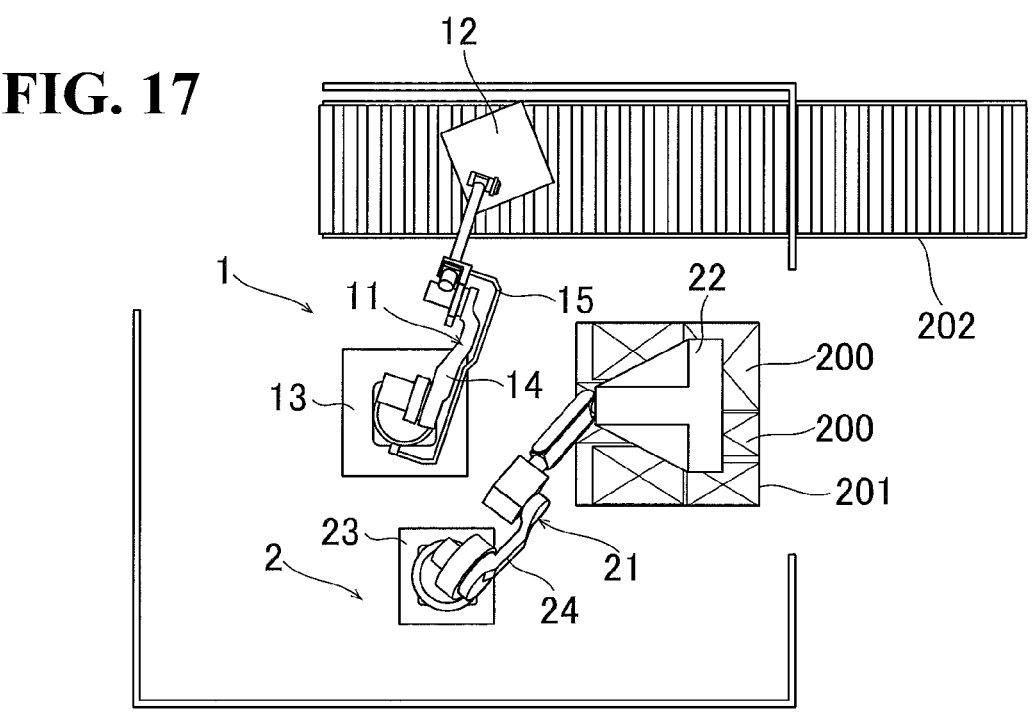
FIG. 17 is a diagram illustrating an operation of placing the workpiece and an operation of detecting the arrangement state of the workpiece by the robot system according to the embodiment.

First, as shown in FIG. 16, at step S1, based on the latest detection operation by the laser light emitting device 7 and the camera 8 detecting the arrangement state of the workpiece 200 disposed on the uppermost level of the pallet 201, the robot hand 12 of the robot arm 14 holds the workpiece 200, and the robot arm 14 moves to place the workpiece 200 onto the conveyor 202, as shown in FIG. 17.

Simultaneously with the placement operation of the workpiece 200 by the robot arm 14 (or simultaneously with the transfer operation of the workpiece 200), the robot arm 24 moves to arrange the robot hand 22 (the laser light emitting device 7 and the camera 8), which are mounted on the robot arm 24, over the pallet 201.

Then, at step S2, the laser light emitting device 7 emits laser light to the workpiece 200, and the camera 8 captures an image of the laser light reflected from the workpiece 200 so as to detect an arrangement state (such as height, shape, and size) of a workpiece 200 next to be held on the pallet 201. Then, the next-to-be-held workpiece 200 (which is, for example, disposed on the uppermost level) is selected among a plurality of detected workpieces 200.

Figure 18:
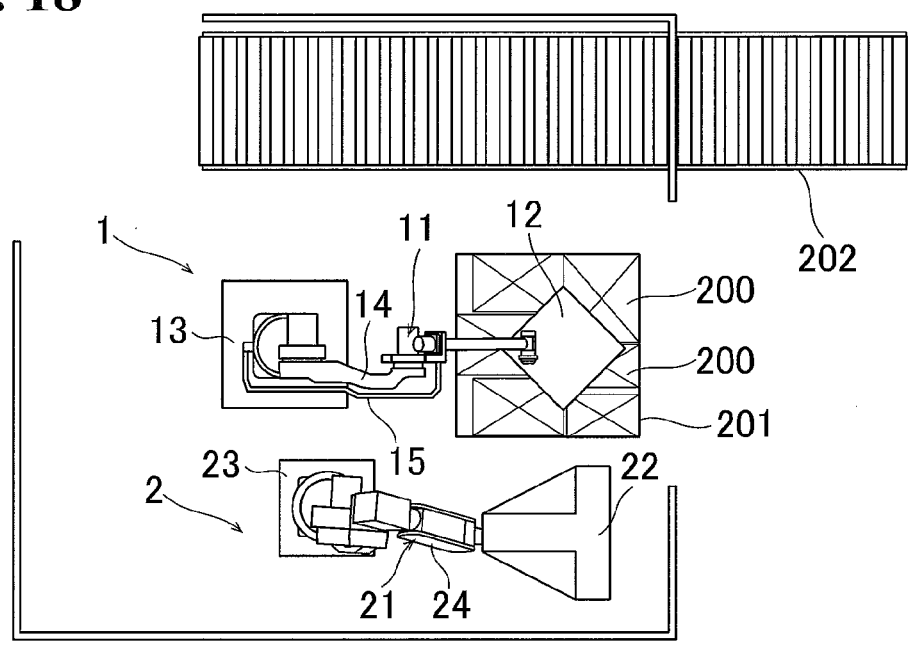
FIG. 18 is a diagram illustrating an operation of holding the workpiece by the robot system according to the embodiment.

Next, at step S3, as shown in FIG. 18, the robot arm 14 moves to a position over the pallet 201. Then, simultaneously with the movement operation of the robot arm 14, the robot arm 24 is withheld in a direction apart from the pallet 201 from the position adjacent to the pallet 201 in order to avoid collision with the robot arm 14.

Next, at step S4, when the workpiece 200 to be held is disposed on, for example, the Y2 direction side (or on the Y1 direction side), which is orthogonal to the X direction, then as shown in FIGS. 10 and 11 (or FIGS. 12 and 13), the robot arm 14 turns the robot hand 12 by approximately 45 degrees to the Y2 direction side (or to the Y1 direction side) from the basic state (see FIG. 4). Then, the robot hand 12 moves to a position over the next-to-be-held workpiece 200. Then, at step S5, the robot hand 12 holds the workpiece 200 such that in plan view, some of the suction devices 121 positioned at the portion where the workpiece 200 and the robot hand 12 overlap are switched to operation mode, while the other suction devices 121 are left in nonoperation mode. Then, the processing returns to step S1, where the workpiece 200 is placed onto the conveyor 202. After the workpiece 200 is placed on the conveyor 202, all the suction devices 121 are switched to nonoperation mode.

Then, the operations at steps S1 to S5 are repeated until no workpieces 200 are left in the pallet 201, and thus the depalletizing processing of the workpieces 200 by the robot hand 12 completes.

Next, the inhibition of contact between the depalletizing robot 1 and the pallet 201 will be described by comparison with a robot 300 according to a comparative example.

As shown in FIG. 19, in the robot 300 according to the comparative example, a robot hand 301 is coupled to a robot arm 302 at the geometrical center (that is, at a point B) of the robot hand 301. As shown in FIG. 20, when the robot hand 301 holds a workpiece 200 disposed on the Y1 direction side of the pallet 201, a cable 303 comes into contact with the pallet 201. In contrast, as shown in FIG. 13, in the depalletizing robot 1 according to the embodiment, the robot hand 12 is coupled to the robot arm 14 at the base portion of the robot hand 12 such that the turning axis A5 of the robot arm 14 is apart from the geometrical center of the robot hand 12. Also, when the workpiece 200 to be held is disposed on the Y1 direction side of the pallet 201, the robot hand 12 holds the workpiece 200 while being turned by approximately 45 degrees to the Y1 direction side (which also applies to the case where the workpiece 200 is disposed on the Y2 direction side). Thus, the robot arm 14 is closer to the center of the pallet 201 than the robot arm 302 shown in FIG. 20 is to the center of the pallet 201. This eliminates or minimizes contact between the depalletizing robot 1 (as well as the cable 15) and the pallet 201. As shown in FIGS. 10 to 13, no or minimal contact occurs between the depalletizing robot 1 (as well as the cable 15) and the pallet 201 no matter where on the pallet 201 the workpiece 200 to be held is disposed.

In this embodiment, as described above, the base portion of the robot hand 12 is coupled to the robot arm 14 such that the turning axis A5 of the portion of the robot arm 14 to which the base portion of the robot hand 12 is coupled is apart from the geometrical center of the robot hand 12. The PC 6 controls the robot hand 12 to hold the workpiece 200 placed on the pallet 201 while controlling the robot arm 14 to turn the robot hand 12 such that the distal end portion of the robot hand 12 is oriented in a direction crossing the X direction, in which the robot arm 14 extends. This ensures that when holding the workpiece 200, the robot arm 14 is able to come closer to the center of the pallet 201 by the amount of the turning of the distal end portion of the robot hand 12 in the direction crossing the X direction. This eliminates or minimizes contact of the robot arm 14 with the pallet 201 (on the circumference (wall) of the pallet 201) when the robot hand 12 holds the workpiece 200.

Also in this embodiment, as described above, the PC 6 controls the robot hand 12 to hold the workpiece 200 while controlling the robot arm 14 to turn the robot hand 12 such that in plan view, an outer edge of the distal end portion of the robot hand 12 is approximately parallel to an outer edge of the pallet 201. Thus, the suction devices 121 disposed on the distal end portion of the robot hand 12 are in use in most cases. This facilitates selection of the suction devices 121 in holding the workpiece 200, as opposed to the selective use of the suction devices 121 depending on where the workpiece 200 is arranged; only those suction devices 121 at the center of the robot hand 12 are used in some cases, while in other cases only those suction devices 121 at the base portion of the robot hand 12 are used.

Also in this embodiment, as described above, the PC 6 controls the robot hand 12 to hold the workpiece 200 while controlling the robot arm 14 to turn the robot hand 12 by approximately 45 degrees such that the two sides 12b and 12c of the robot hand 12, which are orthogonal to each other at the distal end portion of the approximately square shape of the robot hand 12, are approximately parallel to the two sides 201a and 201b of the pallet 201. Thus, even when an approximately rectangular workpiece 200 is disposed at a corner of an approximately rectangular pallet 201, the outer edges of the robot hand 12 are positioned along the corresponding outer edges of the workpiece 200. This ensures reliable holding of the workpiece 200 with the workpiece 200 and the robot hand 12 overlapping each other.

Also in this embodiment, as described above, the PC 6 controls the robot hand 12 to hold the workpiece 200 while controlling the robot arm 14 to turn the robot hand 12 such that in plan view, the distal end portion of the robot hand 12 is oriented in a direction crossing the X direction from the basic state in which the distal end portion and the base portion of the robot hand 12 are aligned in the X direction. This ensures quick turning of the distal end portion of the robot hand 12 in the direction in which the to-be-held workpiece 200 is disposed, as opposed to the case where the robot hand 12 turns in the direction in which the to-be-held workpiece 200 is disposed from the state in which the distal end portion of the robot hand 12 is oriented in the direction opposite to the direction in which the next-to-be-held workpiece 200 is disposed.

Also in this embodiment, as described above, when the workpiece 200 to be held by the robot hand 12 is disposed on one side of the Y direction, which is orthogonal to the X direction, the PC 6 controls the robot hand 12 to hold the workpiece 200 while controlling the robot arm 14 to turn the robot hand 12 to the one side of the Y direction from the basic state. When the workpiece 200 to be held by the robot hand 12 is disposed on the other side of the Y direction, the PC 6 controls the robot hand 12 to hold the workpiece 200 while controlling the robot arm 14 to turn the robot hand 12 to the other side of the Y direction from the basic state. Thus, regardless of whether the workpiece 200 is disposed on one side or the other side of the robot hand 12 in plan view, turning the robot hand 12 by approximate 45 degree ensures holding of the workpiece 200 disposed on the one side or the other side of the robot hand 12. This eliminates or minimizes lengthening of the tact time for the operation of holding the workpiece 200 caused by turning of the robot hand 12 by a larger degree (larger than 45 degrees).

Also in this embodiment, as described above, in plan view, the base portion of the robot hand 12 coupled to the robot arm 14 is at a position offset in the Y direction, which is orthogonal to the X direction, from the geometrical center of the robot hand 12. This ensures that the robot arm 14 is disposed closer to the center of the pallet 201 by the amount of the offset of the robot hand 12 in the Y direction. This effectively eliminates or minimizes contact between the robot arm 14 and the pallet 201.

Also in this embodiment, as described above, in plan view, the depalletizing robot 1 is asymmetric with respect to the center line C of the depalletizing robot 1, which is aligned in the X direction such that the robot arm 14 protrudes to one side of the Y direction (that is, to the Y1 direction side).

Further, in plan view, the base portion of the robot hand 12 coupled to the robot arm 14 is at a position offset to the other side (that is, to the Y2 direction side) of the Y direction opposite to the Y1 direction side, to which the robot arm 14 protrudes. This ensures that the robot arm 14 is disposed closer to the center of the pallet 201 by the amount of the offset of the robot arm 14 to the Y direction side (that is, to the Y2 direction side) opposite to the Y1 direction side, to which the robot arm 14 protrudes. This reliably eliminates or minimizes contact between the robot arm 14 and the pallet 201.

Also in this embodiment, as described above, the robot arm 24 includes the laser light emitting device 7 and the camera 8 to detect an arrangement state of the workpiece 200 placed on the pallet 201. With this configuration, the PC 6 controls the robot arm 14 to move based on the arrangement state of the workpiece 200 detected by the laser light emitting device 7 and the camera 8, and controls the robot hand 12 to hold the workpiece 200 placed on the pallet 201. This facilitates holding of the workpiece 200 placed on the pallet 201 based on the arrangement state of the workpiece 200 detected by the laser light emitting device 7 and the camera 8.

The above-described embodiment has been illustrated as using two robots, namely, the depalletizing robot having five degrees of freedom and the detection robot having six degrees of freedom to detect an arrangement state of the workpiece disposed on the pallet and to hold and transfer the workpiece. It is also possible to use a single two-arm robot to detect an arrangement state of the workpiece disposed on the pallet and to hold and transfer the workpiece. The number of control axes for each of the depalletizing robot and the detection robot is selectable conveniently. For example, it is possible to use a robot arm having four degrees of freedom or a robot arm having more than four degrees of freedom for each of the depalletizing robot and the detection robot.

Also in the above-described embodiment, the robot hand has been illustrated as holding the workpiece at the distal end portion of the robot hand. The robot hand may also hold the workpiece at the center of the robot hand, for example.

Figure 21:
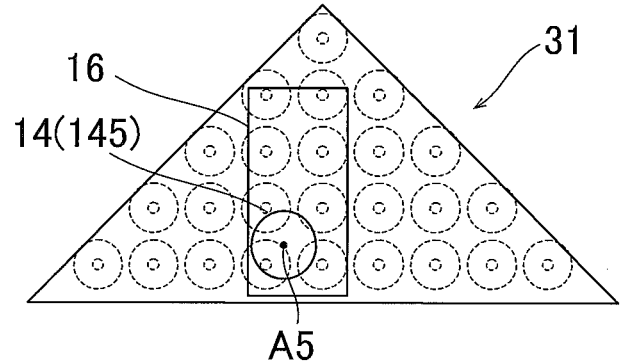
FIG. 21 is a plan view of a first modification of the robot hand according to the embodiment.
Figure 22:
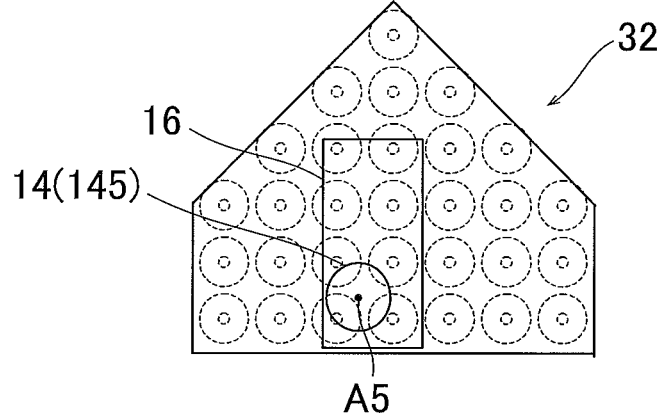
FIG. 22 is a plan view of a second modification of the robot hand according the embodiment.

Also in the above-described embodiment, the robot hand has been illustrated as having an approximately square shape in plan view. Another possible example is a robot hand 31 according to a first modification shown in FIG. 21. In plan view, the robot hand 31 has an approximately triangular shape having two sides orthogonal to each other at the distal end portion of the robot hand 31. Still another possible example is a robot hand 32 according to a second modification shown in FIG. 22. The robot hand 32 has an approximately hexagonal shape having two sides orthogonal to each other at the distal end portion of the robot hand 32. The robot hand may also have a shape other than a polygonal shape such as an approximately square shape (examples including, but not limited to, an elliptical shape). Also in these modifications, the base portion of the robot hand is coupled to the robot arm such that the turning axis A5 of the portion of the robot arm to which the base portion of the robot hand is coupled is apart from the geometrical center (that is, the geometrical center of gravity) of the robot hand. The robot hands 31 and 32 are examples of the "holder".

Also in the above-described embodiment, the robot hand has been illustrated as holding the workpiece while being turned by approximately 45 degrees by the robot hand. The robot hand may also hold the workpiece while being turned by other than approximately 45 degrees.

Also in the above-described embodiment, the robot hand has been illustrated as holding the workpiece while being turned by the robot arm from the basic state in which the distal end portion and the base portion of the robot hand are aligned in the X direction (see FIG. 4). Another possible example is that the distal end portion of the robot hand is turned in advance, and from this state, the robot hand is further turned to a position corresponding to the position of the workpiece so as to hold the workpiece.

Also in the above-described embodiment, the base portion of the robot hand coupled to the robot arm has been illustrated as being, in plan view, at a position offset in the Y direction, which is orthogonal to the X direction, from the geometrical center of the robot hand. Another possible example is to couple the robot hand to the robot arm without making the robot hand offset in the Y direction. Also in this case, the base portion of the robot hand is coupled to the robot arm such that the turning axis of the portion of the robot arm to which the base portion of the robot hand is coupled is offset from the geometrical center of the robot hand.

Also in the above-described embodiment, the base portion of the robot hand coupled to the robot arm has been illustrated as being at a position offset in a direction opposite to the direction in which the robot arm protrudes. Another possible example is to make the robot hand offset in the same direction in which the robot arm protrudes and to couple the robot hand to the robot arm.

Also in the above-described embodiment, a depalletizing operation has been illustrated, in which the workpieces stacked on the pallet are depalletized by the robot system. The robot system may also perform an operation other than the depalletizing operation, examples including, but not limited to, a palletizing operation.

Also in the above-described embodiment, the PC has been illustrated as controlling the operation of the robot (the robot system). It is also possible to use a PLC or a robot controller to control the operation of the robot.

Also in the above-described embodiment, pneumatic suction force is used to hold the workpiece. It is also possible to use electromagnetic suction force (that is, magnetic force using a magnet) to hold the workpiece.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A robot system comprising:
   a first robot arm configured to extend in a first direction;
   a holder configured to hold a workpiece placed on a workpiece placement stand, the holder having an approximately square shape in a plan view, the holder comprising a distal end portion and a base portion, the base portion being rotatably coupled to the first robot arm, the base portion being at a position offset in a second direction approximately orthogonal to the first direction from the center of the approximately square shape of the holder in the plan view;
   a controller configured to control the holder to hold the workpiece placed on the workpiece placement stand while controlling the first robot arm to turn the holder with the distal end portion of the holder oriented in a direction crossing the first direction;
   a camera configured to capture an image of the workpiece; and
   a plurality of suction holes provided on the holder, at least one suction hole among the plurality of suction holes being to be switched to an operation mode based on the image.

2. The robot system according to claim 1, wherein the controller is configured to control the holder to hold the workpiece while controlling the first robot arm to turn the holder such that an outer edge of the distal end portion of the holder is approximately parallel to an outer edge of the workpiece placement stand.

3. The robot system according to claim 2, wherein the controller is configured to control the holder to hold the workpiece while controlling the first robot arm to turn the holder such that the distal end portion of the holder is oriented in a direction crossing the first direction from a basic state in which the distal end portion and the base portion of the holder are aligned in the first direction.

4. The robot system according to claim 3,
wherein when the workpiece to be held by the holder is disposed on one side of a second direction orthogonal to the first direction, the controller is configured to control the holder to hold the workpiece while controlling the first robot arm to turn the holder to the one side of the second direction from the basic state, and
wherein when the workpiece to be held by the holder is disposed on another side of the second direction, the controller is configured to control the holder to hold the workpiece while controlling the first robot arm to turn the holder to the other side of the second direction from the basic state.

5. The robot system according to claim 2,
wherein the workpiece placement stand comprises an approximately rectangular shape surrounding the workpiece,
wherein the holder comprises a shape having two sides approximately orthogonal to each other at the distal end portion of the holder, and
wherein the controller is configured to control the holder to hold the workpiece while controlling the first robot arm to turn the holder such that the two sides of the holder are respectively approximately parallel to two sides of the workpiece placement stand.

6. The robot system according to claim 5,
wherein a portion adjacent to a corner of the base portion of the approximately square shape of the holder is coupled to the first robot arm, and
wherein the controller is configured to control the holder to hold the workpiece while controlling the first robot arm to turn the holder by approximately 45 degrees such that the two sides at the distal end portion of the approximately square shape of the holder are respectively approximately parallel to the two sides of the workpiece placement stand.

7. The robot system according to claim 6, wherein the controller is configured to control the holder to hold the workpiece while controlling the first robot arm to turn the holder such that the distal end portion of the holder is oriented in a direction crossing the first direction from a basic state in which the distal end portion and the base portion of the holder are aligned in the first direction.

8. The robot system according to claim 7,
wherein when the workpiece to be held by the holder is disposed on one side of a second direction orthogonal to the first direction, the controller is configured to control the holder to hold the workpiece while controlling the first robot arm to turn the holder to the one side of the second direction from the basic state, and
wherein when the workpiece to be held by the holder is disposed on another side of the second direction, the controller is configured to control the holder to hold the workpiece while controlling the first robot arm to turn the holder to the other side of the second direction from the basic state.

9. The robot system according to claim 5, wherein the controller is configured to control the holder to hold the workpiece while controlling the first robot arm to turn the holder such that the distal end portion of the holder is oriented in a direction crossing the first direction from a basic state in which the distal end portion and the base portion of the holder are aligned in the first direction.

10. The robot system according to claim 9,
wherein when the workpiece to be held by the holder is disposed on one side of a second direction orthogonal to the first direction, the controller is configured to control the holder to hold the workpiece while controlling the first robot arm to turn the holder to the one side of the second direction from the basic state, and
wherein when the workpiece to be held by the holder is disposed on another side of the second direction, the controller is configured to control the holder to hold the workpiece while controlling the first robot arm to turn the holder to the other side of the second direction from the basic state.

11. The robot system according to claim 1, wherein the controller is configured to control the holder to hold the workpiece while controlling the first robot arm to turn the holder such that the distal end portion of the holder is oriented in a direction crossing the first direction from a basic state in which the distal end portion and the base portion of the holder are aligned in the first direction.

12. The robot system according to claim 11,
wherein when the workpiece to be held by the holder is disposed on one side of a second direction orthogonal to the first direction, the controller is configured to control the holder to hold the workpiece while controlling the first robot arm to turn the holder to the one side of the second direction from the basic state, and
wherein when the workpiece to be held by the holder is disposed on another side of the second direction, the controller is configured to control the holder to hold the workpiece while controlling the first robot arm to turn the holder to the other side of the second direction from the basic state.

13. The robot system according to claim 1, further comprising a robot comprising the first robot arm,
wherein the robot is asymmetric with respect to a center line of the robot aligned in the first direction such that the first robot arm protrudes to one side of the second direction, and
wherein the base portion of the holder coupled to the first robot arm is at a position offset to another side of the second direction opposite to the one side of the second direction.

14. The robot system according to claim 1, further comprising a second robot arm comprising a detector configured to detect an arrangement state of the workpiece placed on the workpiece placement stand,
wherein the controller is configured to control the first robot arm to move based on the arrangement state of the workpiece detected by the detector so as to control the holder to hold the workpiece placed on the workpiece placement stand.

15. A method for transferring a workpiece, the method comprising:
controlling a robot arm to turn a holder comprising a distal end portion and a base portion so as to orient the distal end portion of the holder in a direction crossing a first direction in which the robot arm is configured to extend, the holder having an approximately square shape in a plan view, the base portion being rotatably coupled to the robot arm, the base portion being at a position offset in a second direction approximately orthogonal to the first direction from the center of the approximately square shape of the holder in the plan view; and capturing an image of the workpiece;

switching at least one suction hole among a plurality of suction holes provided on the holder to an operation mode based on the image; and controlling the holder to hold the workpiece placed on a workpiece placement stand using the at least one suction hole in the operation mode after controlling the robot arm to turn the holder.

\* \* \* \* \*